United States Patent Office 3,740,353
Patented June 19, 1973

3,740,353
LOW DENSITY LOW SHRINK THERMOSET RESIN FOAMS
Frank D. Patrick, Freeport, and Daniel J. Najvar, Lake Jackson, Tex., assignors to The Dow Chemical Company, Midland, Mich.
No Drawing. Filed Nov. 9, 1970, Ser. No. 88,102
Int. Cl. C08g 53/08, 39/10
U.S. Cl. 260—2.5 N
24 Claims

ABSTRACT OF THE DISCLOSURE

Previous problems of shrinkage in the preparation of low density thermoset resin foams from thermo-settable water-in-resin emulsions containing certain nonionic surfactants may be eliminated or significantly reduced by incorporating into the emulsion hydrocarboaceous dimensional control agents. Useful resins include unsaturated polyester resins or polymerizable vinyl ester resins.

BACKGROUND OF THE INVENTION

Techniques by which polymerizable vinyl ester resins or unsaturated polyester resins may be converted into water-in-oil type emulsions have been developed. U.S. 3,256,219 describes certain polyester emulsions. Upon curing of the emulsion the dispersed droplets of water or aqueous phase become entrapped in the thermoset resin matrix forming a high density foam containing high proportions of water. Such foams have a number of uses for making a variety of molded objects such as statues, wall plaques, etc. Vinyl ester resins are highly preferred over polyesters because of the ease with which they self-emulsify and the stability of the resulting water-in-oil (resin) type emulsions.

When it is desired to remove the water from the above high density foams other problems are encountered such as dimensional stability and ease of water removal. Upon heating, cast or molded objects will crack, chip, split, warp, etc. which destroys the usefulness of the resultant low density foam. Because there is considerable interest in such low density foams particularly as wood substitutes, means were sought to eliminate the above problems.

A solution to the dewatering problem was found in which a particular polyalkyleneoxide block copolymer nonionic surfactant was added to the water-in-resin (oil) emulsion and is the subject of a separate copending application. However, when these improved emulsions were cast and cured, such as to make a decorative cabinet door, shrinkage problems were still encountered. Other problems encountered were: the presence of water in the mold after curing which needed to be removed before the next molding cycle; post finishing of the de-hydrated part (low density foam) used excessive amounts of finishes because of high absorbance; and deaeration of the emulsions before curing was sometimes slow and difficult.

This invention relates to the solution of the above problems in the production of low density, thermoset resin foams.

SUMMARY OF THE INVENTION

It is an object of this invention to provide thermosettable water-in-oil type emulsions which may be cured and readily dewatered to a low density thermoset resin foam. It is a further object to reduce or eliminate shrinkage problems during the curing and dewatering steps. It is a further object to provide one or more of the following benefits: reduce water-in-the-mold problems, improve the finishing characteristics of the castings and deaerate the liquid emulsions more easily.

The above benefits and advantages are obtained by preparing low density foams from a water-in-resin emulsion which comprises (1) from about 30 to 80 weight percent of a dispersed aqueous phase and from about 70 to 20 weight percent of a continuous thermosettable resin phase, (2) from about 0.005 to 10 parts per 100 parts of said emulsion of a polyalkyleneoxide block copolymer nonionic surfactant, wherein the hydrophobic group has a molecular weight of at least about 1000, and (3) from about 0.1 to 20 parts per 100 parts of said emulsion of hydrocarbonaceous dimensional control agent having a molecular weight of about 200 to 150,000, preferably about 500 to 20–25,000 and more preferably about 500 to 10,000.

The continuous thermosettable resin phase comprises about 30 to 80 weight percent of a polymerizable resin which may be a vinyl ester resin, an unsaturated polyester or mixtures thereof and from about 70 to 20 weight percent of a copolymerizable monomer.

DETAILED DESCRIPTION OF THE INVENTION

The principal and most valuable benefit of this invention is reduction or complete elimination of shrinkage during the curing and dewatering steps of preparing a low density foam from a thermosettable water-in-oil type emulsion wherein the thermosettable resin constitutes the continuous phase. Advantageously it has also been found that the emulsions of this invention deaerate more readily, minimize or eliminate the problem of residual water in the mold after curing, accept finishes and coatings without excessive absorption and dewater readily without cracking.

The above benefits and advantages may be obtained by the addition of about 0.1 to 20, preferably 1 to 10, parts of a hydrocarbonaceous dimensional control agent per 100 parts of emulsion. Said hydrocarbonaceous agent is characterized in being essentially insoluble in both the aqueous phase and the resin phase and in having a molecular weight of about 200 to 150,000. Preferably said agent has a lower molecular weight of about 500 to 20–25,000 and more preferably has a molecular weight of about 500 to 10,000. By hydrocarbonaceous it is meant that said agents have the above characteristics and are either hydrocarbons or materials which have sufficient hydrocarbon content to be functionally equivalent to hydrocarbons when employed as a dimensional control agent.

Synthetically prepared hydrocarbons include the homopolymers and interpolymers of olefinc monomers having the formula, $CH_2=CH-R$ where R is hydrogen, an alkyl radical, an alkenyl radical or an aryl radical or an aryl radical. Typical monomers are the α-olefins such as ethylene, propylene, butylene, isobutylene and the like. While much higher molecular weight α-olefin monomers may be employed, commercial availability and cost generally limits the selection of monomers to the lower α-olefins of about 2 to 10 carbon atoms.

When R is an alkenyl group the monomers are diolefinic. Preferably herein such monomers are conjugated diolefins such as butadiene, isoprene, chloroprene and the like. While a large number of unsaturated diolefins are known, again, practical consideration make butadiene a preferred monomer.

Styrene is the best known of the aryl olefins monomers (i.e. when R is an aryl group) but also included are vinyl toluene, α-methyl styrene, t-butyl styrene, and similar monomers.

The molecular weight of said olefinc homopolymers and interpolymers ranges from lower molecular weight "oils" up to high molecular weight solids. Many of the lower to intermediate molecular weight polymers are soft, semi-solids which are commonly known as "polyethylene greases or waxes" and have found utility in such non-analogous fields as pour point depressants.

Hydrocarbonaceous synthetic interpolymers also include interpolymers in which a portion of said olefinic monomers used to prepare the interpolymers is replaced by at least one copolymerizable monomers which is not an olefinic monomer. A variety of such copolymerizable monomers are useful including acrylic and methacrylic acid; vinyl esters such as vinyl acetate, vinyl propionate, etc.; alkyl esters of acrylic and methacrylic acid such as the ethyl, butyl, isopropyl and like esters; acrylonitrile; hydroxyalkyl acrylates and methacrylates and the like.

Typical hydrocarbonaceous interpolymers include polyethylene, polystyrene, ethylene/propylene copolymers, terpolymers of ethylene/propylene/isobutylacrylate, copolymers of ethylene/styrene, copolymers of ethylene/vinyl acetate, copolymers of styrene/acrylic acid and like polymers. Such polymers are readily prepared by known polymerization techniques using a variety of catalysts or ionizing radiation to initiate polymerization. Generally the polymerization of ethylene, propylene, etc. is conducted under superatmospheric pressures. The preparation of ethylene/styrene copolymers is described in U.S. 3,271,121; of ethylene/vinyl acetate in U.S. 3,159,608; and various ethylene copolymers in U.S. 3,131,168. It is not considered necessary to recite further references to the preparation of the olefin polymers since it is the use of these polymers not their preparation which is the subject of this invention.

The hydrocarbonaceous dimensional control agents are characterized in that said agents are essentially insoluble in both the aqueous phase and the organic resin phase. While there is no intent to be held to any theoretical explanation it is believed that the shrinkage control may be due, at least in part, to a concentration or filming-out of a portion of said dispersed control agent at the water droplet/resin interface which prevents loss of water at exothermic curing temperatures in the molds, but at more elevated temperatures the film breaks or melts allowing the water free access to the surface where it evaporates away. However, it is to be noted that the thermoset foams dehydrate on standing at ambient temperatures indicating that the water droplets are not rigidly entrapped.

Another factor which is theorized may play an important role in shrinkage control relates to the possible formation of micelles within the resin phase by a portion of said dispersed control agent wherein the micelle contains within it small amounts of unpolymerized monomer which under the heat of the dehydration stage provides a "resistance" to shrinkage due to polymerization or foaming of the monomer. It is to be understood this invention is not dependent on the above possible explanations since later research may very well demonstrate completely different factors are responsible for the shrinkage control.

In addition to the dimensional control agent, the presence of about 0.005 to 5 parts per 100 parts of the emulsion of a polyalkyleneoxide block copolymer nonionic surfactant is necessary to obtain dewaterability of the thermoset foam without the foam splitting, cracking, etc., especially when heated to remove the water at temperatures above the boiling point of water.

For purposes of this invention suitable surfactants include the polyalkylene oxide block copolymers as described by I. R. Schmolka in chapter 10 of "Nonionic Surfactants," vol. 1, edited by M. J. Schick, published by Marcel Dekker, Inc., New York (1967). More specifically, said surfactants include block copolymers prepared from low molecular weight mono- and polyfunctional initiators wherein the hydrophobic group has a minimum molecular weight of at least about 1000.

The block copolymer nonionic surfactants include:

(1) block copolymers formed by the addition of one alkylene oxide to an initiator followed by the addition of a different alkylene oxide.

(2) heteric-block copolymers prepared by the addition of an alkylene oxide to an initiator followed by reaction of a mixture of alkylene oxides or copolymers in which the sequence of addition is reversed, and (3) heteric copolymers in which an initiator is reacted with a mixture of alkylene oxides followed by reaction with a different mixture of alkylene oxides or a mixture having different proportions of alkylene oxides. The initiator may be inorganic or organic and contains at least one reactive hydrogen. Preferably it is a low molecular weight alcohol or glycol.

The preparation of such polymers is well known and is described in said chapter 10 as well as in various patents. Since the details of preparation are readily available to and known by the art, such will not be included herein.

Particularly suitable block copolymer nonionic surfactants include the mono-initiated block heteric copolymers wherein the hydrophobic group has a minimum molecular weight of about 1000, and preferably a molecular weight of about 1000 to 2000, wherein the initiator is an aliphatic monohydric alcohol containing from 1 to about 8 carbons. Especially preferred from this group of surfactants are those wherein the initiator is reacted with a mixture of propylene oxide and ethylene oxide in the weight ratio of about 95:5 to about 85:15, respectively, to form the hydrophobic group followed by reaction with ethylene oxide to form the hydrophylic group. The hydrophylic group comprises from about 44 to 55 weight percent of the weight of the surfactant. In general said surfactants are prepared by reacting a mixture of ethylene and propylene oxide with the initiator in a liquid phase containing the catalyst under known oxyalkylation conditions of temperature, catalysts and concentrations thereof, etc. followed by addition of the ethylene oxide. The product is neutralized and impurities removed by extraction and/or heating to remove volatiles. U.S. 3,078,315 may be consulted for further preparative details.

Another group of particularly suitable block copolymer nonionic surfactants are the difunctional initiated all block copolymers made by the sequential addition of propylene oxide to an initiator such as propylene glycol followed by reaction with ethylene oxide. The reaction is generally run at about 120° C. using anhydrous sodium hydroxide as a catalyst. The hydrophobic group should have a molecular weight of at least about 1000, preferably about 1750 to 3250 and the polyoxyethylene (hydrophilic) group should comprise from about 60 to 90 weight percent of the block copolymer. The more preferred surfactants contain about 80 weight percent of polyoxyethylene. Such surfactants and their preparation are disclosed in U.S. 2,674,619 which may be consulted for further details.

For preparation of said surface active agents propylene oxide and ethylene oxide are the preferred alkylene oxides with propylene oxide providing hydrophobic properties and ethylene oxide hydrophylic properties. Other higher alkylene oxides such as butylene oxide or the like may be used in place of the propylene oxide or to partially replace same.

While certain preferred nonionic surfactants prepared from either a monofunctional or a difunctional initiator have been described polyalkylene oxide block copolymers prepared from higher functional initiators such as glycerine, pentaerythritol and the like may also be used with this invention.

Effective proportions of said nonionic surfactant in the emulsion range from about 0.005 part to about 2 parts per 100 parts of emulsion. While there is no particular advantage higher proportions up to about 10 parts of nonionic surfactant may be used, however the emulsion becomes increasingly thixotropic as the proportion of surfactant increases above about 5 parts.

Other surfactants may be used in combination with the polyalkylene oxide block copolymer nonionic surfactants provided the above proportions are present in the emulsion. A wide variety of cationic, anionic or other non-ionic surfactants may be used in combination with said block copolymer nonionic surfactant and may be used to control or reduce the thixotropic nature of the emulsion. The other surfactants may be used effectively in proportions up to about 3 parts per 100 parts of emulsion. Larger proportions may be used but there is no advantage in doing so.

The above utility of said nonionic surfactants to improve the dewaterability of the cured emulsion is the subject of an application for a patent by D. J. Najvar, Ser. No. 861,460, filed on Sept. 26, 1969, now U.S. 3,669,911.

The usual and unexpected results obtained with the polyalkylene oxide block copolymer nonionic surfactants are to be contrasted with the inability of a large number of other nonionic surfactants to provide similar results. It has been determined by laboratory testing of representative surfactants that the following classes of non-ionic surfactants which are all separately described in said textbook, "Nonionic Surfactants," are inoperative: Polyoxyethylene alkyl phenols, polyoxyethylene esters of fatty alcohols, polyoxyethylene esters of fatty acids, polyoxyethylated alkylamines and alkylamides and the like. The above inoperative nonionic surfactants may be distinguished from the useful nonionic surfactants of this invention in that they all are prepared from a high molecular weight initiator which also comprises the hydrophobic portion of the surfactant whereas with this invention the initiator alone does not constitute the hydrophobic portion of the surfactant. It is not known why this difference produces the above results.

The water-in-resin emulsions of this invention may be made in different ways but the usual procedure involves adding the block copolymer surfactant and dimensional control agent to the resin in an appropriate container and then adding the water slowly to the resin with sufficient stirring to form a stable emulsion. As with any emulsion, stability is partly dependent on applying sufficient shear in its preparation to form small droplets of the dispersed phase (water, in this instance). Generally, a droplet or particle size of about $1/\mu$ or less is preferred. However, stable emulsions with dispersed particle sizes up to 10–30$\mu$ and even larger may be prepared. A variety of mechanical agitating, stirring or homogenizing devices are well known to the trade for the preparation of such emulsions. The temperature of emulsification can vary widely but is usually between about 30° F. and 150° F., preferably 65–110° F. No advantage is found in using higher temperatures and in instances where the thermosettable resin contains a copolymerizable monomer such as styrene and the like high temperatures which might volatilize the monomer should be avoided.

While the emulsions may be cured by exposing them to ionizing radiation, more frequently it is advantageous to add a free radical generating catalyst, usually to the resin phase before emulsification, and heat to accelerate the cure of the emulsion. A variety of such catalysts are available including peroxides, persulfates, azo catalysts and the like. Benzoyl peroxide, lauroyl peroxide, t-butyl hydroperoxide, t-butyl perbenzoate, methyl ethyl ketone peroxide, potassium persulfate, azobisisobutyronitrile and like catalysts are typical. Normal catalyst levels range from about 0.1 to about 5 weight percent and the emulsion may be cured at temperatures up to about 200° F. or even higher. Frequently it is desirable to accelerate the cure of the emulsion at ambient temperatures which may be accomplished by the adidtion of effective amounts of cure accelerators such as N,N-dimethyl p-toluidine, cobalt naphthanate, N,N-dimethyl aniline and the like. Cure accelerators are normally added to the emulsion just prior to curing.

Advantageously the addition of small amounts of paraffin wax to the resin phase assists in providing tack free surfaces of cast parts due to exclusion of air. A wax level of about 0.07 to 0.25 part per 100 parts of emulsion is sufficient. Conveniently the wax is soluble in styrene and other monomers frequently admixed with the resins.

While frequently the emulsions are referred to as water-in-resin emulsions it is to be understood that various aqueous solutions may also be employed. For example water soluble salts, glycols, glycol ethers, etc. may be present in the aqueous phase.

Casting and curing of the emulsions is generally done under atmospheric pressure. However, castings have been made in matched die molding presses under pressures of 200–300 p.s.i. Likewise the casting and curing may be done at less than atmospheric pressure.

Following cure of the resin emulsion the thermoset resin may be dehydrated merely by standing at room temperature. Dehydration is dependent on both temperature and thickness of the resin, for example, a 1 inch thick resin might take about 15 days at 75° F. to dehydrate but only takes about 2 to 3 hours at 400° F. Temperatures up to about 450°–500° F. may be used if desired. Even at these elevated temperatures the thermoset resins of this invention can be substantially dehydrated without cracking or damage to the resin. Vacuum conditions may also be used in dehydrating the thermoset resin.

Generally, it is found that after curing and demolding that the mold is dry, i.e. no water has been squeezed out of the cured foam due to shrinkage. This eliminates the extra step of drying the mold before the next molding cycle.

The cured, thermoset foam prior to dewatering comprises a continuous thermoset resin matrix having small droplets of the water phase dispersed throughout the matrix. Upon dehydrating the thermoset foam, a low density porous resin foam results which is substantially free of water and which has a density ranging from about 18 to 40 lbs./cu. ft. The resultant low density foam has wood-like properties in that it can be nailed, stapled, machined, drilled, tapped for screws, sawed and finished. The foam is tougher, lighter and more break resistant than plaster-of-paris.

By virtue of the dimensional control agents present in the emulsions it is now possible to directly mold decorative wood-like parts for furniture and the like, cabinet doors, and other parts which may have an intricate design or which may even simulate the grain of wood. Prior to this invention curing and de-watering resulted in shrinkage of as much as 8–10% which greatly limited the use of such thermoset foams.

By thermosettable resin it is first of all meant to include unsaturated polymerizable resins which are admixed with copolymerizable monomers. The admixture of monomers is desirable in order to reduce the overall resin costs, but equally as important the final properties of the cured resin may be varied by the choice of the monomer and the amount used. Generally the unsaturated polymerizable resin comprises from about 30 to 80 weight percent of the mixture with the balance of about 70 to 20 weight percent comprising said monomer or mixtures of same.

A wide selection of copolymerizable monomers is available and include alkenyl aromatics, esters of acrylic or methacrylic acid, vinyl esters, vinyl acids, allyl and methallyl half esters and diesters of dicarboxylic acids, amide monomers and the like. Typical of said monomers are styrene, vinyl toluene, $\alpha$-methyl styrene, halogenated styrenes such as p-chlorosytrene, alkyl substituted aromatics such as t-butyl styrene, methyl methacrylate, ethyl acrylate, butyl acrylate, cyclohexyl methacrylate, $\alpha$-ethyl hexyl acrylate, octyl methacrylate, vinyl acetate, acrylonitrile, acrylic acid, methacrylic acid, crylamide, diacetone acrylamide and the like. Divinyl monomers may also be employed.

Two distinct classes of unsaturated polymerizable (thermosettable) resins are contemplated by this invention. The first class comprises the well known unsaturated polyester resins which are generally prepared by the condensation of a polycarboxylic acid with a polyhydric alcohol. In particular dibasic acids or the anhydrides thereof and glycols are the preferred reactants. The unsaturated sites in the polyester are obtained by using an unsaturated dibasic acid or anhydride. Depending on the properties desired mixtures of both saturated and unsaturated polycarboxylic acids or anhydrides are commonly used.

The unsaturated polyester is typified by a regular repeating unit in the polymer chain having a formula such as

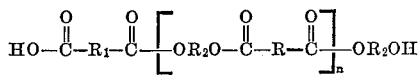

where $R_1$ represents the residual organic portion of a dicarboxylic acid, $R_2$ represents the residual organic portion of a glycol and $n$ is an integer ranging up to 50 or 100 or even higher. Thus a polyester has a regular distribution of ester groups along the polymer chain. Moreover, if the polyester is prepared from a mixture of maleic and phthalic acids the $R_1$ groups would be a random mixture of $-CH_2=CH_2-$ and phenyl groups along the chain. Such polyesters, their preparation and a description of a variety of acids, anhydrides, glycols, etc., which may be used to prepare same are found in "Handbook of Reinforced Plastics of the SPI" by S. Oleesky and G. Mohr, Reinhold Publishing Corp., N.Y. 1964, at pages 13–55. Since such resins and their preparation are fully described in the above book as well as in a host of patents, journals and other reference books, the details thereof need not be repeated herein.

Generally, the unsaturated polyester contains unreacted acid groups even when an excess of the glycol etc. is used. In the preparation of the resin the condensation reaction is continued until some predetermined acid number is reached. Most commercially available unsaturated polyester resins contain both free acid groups and hydroxyl groups.

Maleic anhydride and various glycols such as ethylene glycol, propylene glycol, diethylene glycol and the like are frequently used. In addition fumaric acid, itaconic acid or their anhydrides may also be used. A variety of saturated acids and anhydrides may be used in combination with an unsaturated anhydride, etc. and include phthalic anhydride, isophthalic acid, tetrabromo phthalic acid, chlorendic anhydried, adipic acid and the like. It is to be understood that unsaturated polyesters prepared by replacing the glycol with an appropriate alkylene oxide, for example propylene oxide in place of propylene glycol, also are contemplated herein.

A second class of unsaturated polyester resins contemplated by this invention are the newer, polymerizable vinyl ester resins. Vinyl ester resins are prepared by reacting about equivalent quantities of an unsaturated monocarboxylic acid such as methacrylic acid with a polyepoxide resin. With methacrylic acid and a diglycidyl ether of bisphenol A the vinyl ester resin has the formula

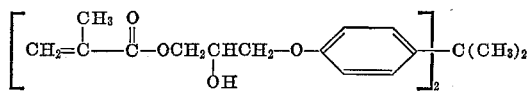

Thus the vinyl ester resin is characterized in having terminal vinylidene groups as opposed to acid or hydroxyl groups found in polyester resins, and also contain hydroxyalkyl ester groups generally adjacent the vinylidene group. The presence of the hydrophilic secondary hydroxyls in the resin enhances the emulsion stability.

Such resins which are herein called vinyl ester resins are described in U.S. 3,367,992 where the unsaturated monocarboxylic acid is an α-hydroxyalkyl acrylate or methacyrlate half ester of a dicarboxylic acid; in U.S 3,066,112; in U.S. 3,179,623; in U.S. 3,256,226 where the molecular weight of the polyepoxide is increased by reaction of same with a dicarboxylic acid; in U.S. 3,446,259; in U.S. 3,301,743; in U.S. 3,377,406 and elsewhere.

As shown in the above references a variety of polyepoxide resins may be used in the preparation of vinyl ester resins. Useful polyepoxides include polyglycidyl ethers of polyhydric phenols and polyhydric alcohols, epoxy novolac resins, epoxidized diolefins or fatty acids or drying oils provided the polyepoxide contains more than one oxirane group per molecule. As previously indicated the polyepoxides also include those wherein the molecular weight is increased by reaction with a difunctional compound such as a dicarboxylic acid.

Preferred polyepoxides are the polyglycidyl ethers of polyhydric phenols and polyhydric alcohols, the epoxy novolac resins and mixtures thereof wherein the epoxide equivalent weight may vary from about 150 up to about 6000. Said polyepoxides are made by reacting at least about two moles of an epihalohydrin with one mole of a polyhydric phenol, polyhydric alcohol or novolac resin and a sufficient amount of a caustic alkali to combine with the halogen of the halohydrin. The products are characterized in having more than one epoxide group per molecule.

Unsaturated monocarboxylic acids useful in preparing vinyl ester resins include acrylic acid, methacrylic acid, halogenated acrylic or methacrylic acids, cinnamic acid, and the like and mixtures thereof. Also inluded are the 2-hydroxyalkyl acrylate or methacrylate half esters of dicarboxylic acids as described in U.S. 3,367,992 wherein the hydroxyalkyl group preferably has from 2 to 6 carbon atoms. Typical half esters include the 2-hydroxyethyl acrylate half ester of maleic acid, the 2-hydroxypropyl methacrylate half ester of phthalic acid and the like. Either saturated or unsaturated dicarboxylic acid half esters may be used. Conveniently the half esters are prepared by reacting about one mole of said hydroxyalkyl acrylate or methacrylate with one mole of a dicarboxylic acid anhydride. Further details may be found in U.S. 3,367,992.

Various catalysts may be used in the preparation of vinyl ester resins. Catalysts include tertiary amines such as tris(dimethylaminomethyl) phenol, onium catalysts, triphenyl stibine and triphenyl phosphine, $CrO_3$ and the like. Usually hydroquinone or other like polymerization inhibitors are added to prevent polymerization during the preparation of the resin.

Also included within the definition of vinyl ester resins are those vinyl ester resins which have been further reacted with a dicarboxylic acid anhydride wherein said anhydride reacts with the hydroxyl group formed in the first step reaction of the monocarboxylic acid with the polyepoxide resin. Such resins are fully described in U.S. 3,446,259. The proportions of anhydride may vary up to about 1 to 1.2 moles or higher if necessary per mole of hydroxyl group.

The vinyl ester resins are preferred because of their self-emulsification properties and the greater stability of the emulsions which are formed. Unsaturated polyesters are more difficult to emulsify and some form emulsions of limited stability, however by the use of cure accelerators and other means the emulsions may be gelled and cured before the emulsion breaks. Of course, mixtures of the thermosettable resins may be used. It is also possible to prepare a vinyl ester resin in the presence of an unsaturated polyester as is disclosed in U.S. 3,506,736.

The following non-limiting examples will further illustrate the present invention. All percentages are by weight unless otherwise specified.

EXAMPLE 1

A vinyl ester resin was prepared by reacting a glycidyl polyether of bisphenol A having an epoxide equivalent weight EEW of 186–192 (D.E.R. 331) with enough bisphenol A to obtain a polyepoxide with an EEW of about 250. This epoxide was reacted with an equivalent amount of methacrylic acid in the presence of hydroquinone (a vinyl polymerization inhibitor) and a catalyst, DMP–30 [tris(dimethylaminomethyl)phenol]. When the weight percent of carboxyl was reduced to about 1 to 1.4% the reaction was stopped and styrene was blended with the resin to make a 50% solution in styrene.

To the resin solution was then added 0.1% of paraffin wax having a melting point of 122–135° F. and 0.1% of Tergitol XD which is a heteric-block surfactant prepared by reacting a mixture of propylene and ethylene oxides with a low molecular weight monohydric aliphatic alcohol to form a hydrophobic group followed by reaction with ethylene oxide. Tergitol XD is a white, soft solid having a cloud point of 60–70° C. (0.5% aqueous solution) and a pH of 6 (0.1% aqueous solution).

From the above resin solution three water-in-resin emulsions were then prepared containing 0 to 150 grams of a dimensional control agent which was a copolymer of ethylene and propylene (containing 40±10% propylene) of about 3000 molecular weight. To cure the emulsions benzoyl peroxide was added as a catalyst and N,N-dimethyl p-toluidine as an accelerator. From each of the emulsions a casting was made in a flexible mold about 531 millimeters long and about ⅝″ thick which was allowed to cure for about 10 minutes. Each of the castings was then removed from the mold and dewatered by heating at 400° F. The thermoset resin foam part was measured and compared to the original mold dimensions after cooling. The composition of the emulsions and the results are shown below:

|  | Castings | | |
|---|---|---|---|
|  | 1A | 1B | 1C |
| Emulsion components: |  |  |  |
| Resin solution, gm | 1,500 | 1,425 | 1,350 |
| Ethylene/propylene copolymer, gm | 0 | 75 | 150 |
| Benzoyl peroxide, gm | 15 | 15 | 15 |
| Water, gm | 1,500 | 1,500 | 1,500 |
| N,N-dimethyl p-toluidine, ml | 6 | 6 | 6 |
| Dehydration results: |  |  |  |
| Weight loss, percent | 52 | 52 | 52 |
| Linear Shrinkage, percent | 4.3 | 2.6 | 0 |

Sample 1A was also found to lose about 1% water in the mold while sample 1C did not dewater and left a dry mold.

The above emulsions were prepared by adding and dispersing the ethylene/propylene copolymer in the resin solution in a suitable mixer with a propeller type blade agitator operated at 2–3000 r.p.m. The peroxide catalyst was then added followed by slowly adding the water into the vortex of the agitated resin. A smooth, creamy, white emulsion was formed. Prior to casting the emulsion into the mold the accelerator was added and mixed into the emulsion.

EXAMPLE 2

Using the resin solution and procedures of Example 1 a water-in-resin emulsion was prepared from the following components, cured and dewatered (dehydrated).

| | |
|---|---|
| Resin solution grams | 1520 |
| Ethylene/isobutyl acrylate/propylene terpolymer [1], M.W. about 3000 do | 80 |
| Benzoyl peroxide do | 16 |
| Water do | 1600 |
| N,N-dimethyl p-toluidine ml | 6.4 |
| Weight loss (1¼ hrs. @ 400° F.) percent | 52 |
| Linear shrinkage do | 0 |

[1] The respective proportions were about 50/42/8.

The ethylene/isobutyl acrylate/propylene terpolymers can be prepared by peroxide catalyzed polymerization at pressures ranging from 13,000 to 21,999 p.s.i. and at temperature of 240–295° C. Useful terpolymers may contain from 10 to 50 percent of isobutyl acrylate and from 3 to 15 percent propylene with the balance to make 100 percent of ethylene. Similar results are found if the isobutyl acrylate is replaced with n-butyl acrylate or 2-ethylhexyl acrylate.

EXAMPLE 3

Using the resin solution and procedures of Example 1, the following emulsion was prepared, cured and dehydrated.

| | |
|---|---|
| Resin solution grams | 1440 |
| Ethylene/propylene copolymer oil do | 160 |
| Benzoyl peroxide do | 16 |
| Water do | 1660 |
| N,N-dimethyl p-toluidine ml | 6.4 |

[1] The respective proportions were about 5/42/8.

The water-in-resin emulsion gelled in 2.5 minutes and was removed from the mold after 5 minutes. (dry mold)

| | Percent |
|---|---|
| Weight loss (1.15 hours @ 400° F.) | 52.1 |
| Linear change | +0.38 |

It is to be noted that the part actually expanded slightly in this instance.

The above copolymer oil contained about 80% ethylene and 20% propylene and had a molecular weight of about 500. The copolymer may be prepared by polymerizing the monomers at 540° F. at 18,000 p.s.i. using di-tertiary butyl peroxide in Isopar E as a catalyst. The copolymer had a melt index of 178 @ 49° C. using a 0.020 inch orifice.

EXAMPLE 4

A water-in-resin emulsion was prepared similar to the previous examples.

| | |
|---|---|
| Resin solution grams | 1440 |
| Ethylene/isobutyl acrylate/propylene terpolymer do | 160 |
| Benzoyl peroxide do | 16 |
| Water do | 1660 |
| N,N-dimethyl p-toluidine ml | 6.4 |

The emulsion had a viscosity of 1250 cps. (RVT Brookfield #3 spindle) and a gel time of 2½ minutes. The casting was demolded after 8 minutes and dehydrated at 400° F. for 1 hour and 35 minutes. The resulting foam had a shrinkage of only 1.13%.

EXAMPLE 5

The emulsion of Example 4 was prepared in a similar manner except that the terpolymer was replaced by Vaseline petroleum jelly (a cream white commercial product). The emulsion had a gel time of 2.5 minutes and was demolded after 8 minutes. The foam was dehydrated for 1.15 hours at 400° F. and found to expand by 2.26%. A series of emulsions similar to Example 1 (@ 50% water) were prepared with varying amounts of petrolatum, cured and dehydrated as above. Shrinkage measurements are summarized below:

| Wt. percent petrolatum (resin basis) | Length, mm. | | Percent linear change |
|---|---|---|---|
|  | Original | After dehydration |  |
| 0 | 302 | 291 | −3.64 |
| 2.5 | 302 | 296 | −1.99 |
| 5.0 | 302 | 300 | −0.66 |
| 10 | 302 | 303 | +0.33 |
| 15 | 302 | 307 | +1.65 |

EXAMPLE 6

The emulsion of Example 4 was repeated by replacing the terpolymer with 160 grams of a 50% dispersion in styrene of a terpolymer containing 17% acrylic acid/38% isobutyl acrylate/45% ethylene having a melt index of 4.2 @ 80° C. through a 0.02 inch orifice.

| | |
|---|---|
| Gel time minutes | 2.9 |
| Mold time do | 9 |
| Heated at 400° F. hours | 1.5 |
| Shrinkage percent | 1.88 |

EXAMPLE 7

Using the resin solution of Example 1 a water-in-resin emulsion was prepared from the following components.

| | |
|---|---|
| Resin solution _____grams__ | 750 |
| Vinyl acetate/ethylene (44/56) copolymer __do____ | 37.5 |
| Benzoyl peroxide _____do____ | 7.5 |
| Water _____do____ | 750 |
| N,N-dimethyl p-toluidine _____percent__ | 0.2 |

The following results were found:

| | |
|---|---|
| Viscosity _____cps__ | 1350 |
| Gel time _____minutes__ | 2.25 |
| Mold time _____do__ | 8 |
| Heated at 400° F. _____hours__ | 1.5 |
| Shrinkage _____percent__ | 1.26 |

EXAMPLE 8

A commercial proprietary unsaturated polyester resin (WEP–33, Ashland Chemical Co.) marketed especially for preparing water-in-resin emulsions was employed to make emulsions according to this invention as follows

| Emulsion | 8A | 8B |
|---|---|---|
| WEP–33 (contains styrene monomer), g _____ | 1,600 | 1,440 |
| Benzoyl peroxide, g _____ | 16 | 16 |
| Terpolymer of Example 2, g _____ | 0 | 80 |
| Tergitol XH (23% solution in styrene), ml _____ | 7 | 7 |
| Styrene, g _____ | 0 | 80 |
| Water, g _____ | 1,600 | 1,600 |
| N,N-dimethyl p-toluidine, ml _____ | 6.4 | 6.4 |
| Gel time, min _____ | 2.5 | 2 |
| Linear shrinkage, percent _____ | 7.9 | 1.5 |

The improvement in shrinkage control is evident in Emulsion 8B. Tergitol XH is similar to Tergitol XD but is a higher molecular weight nonionic surfactant and has a higher cloud point and increased water solubility than Tergitol XD.

EXAMPLE 9

A vinyl ester resin was prepared by reacting 1 equivalent of DER 331 with 1 equivalent of methacrylic acid until the carboxyl content was reduced to about 1 to 1.5%. The resin was then mixed with styrene to obtain a 50% solution of the resin in styrene. To this resin solution was then added 0.1% of Tergitol XH and 0.1% of paraffin wax.

Two water-in-resin emulsions were then prepared at 50% and 60% water employing the terpolymer of Example 2 as a shrink control agent. The thermoset emulsions (foams) were dehydrated at 370° F.

| | 50% water | 60% water |
|---|---|---|
| Resin solution, g _____ | 1,500 | 1,170 |
| Terpolymer of Example 2, g _____ | 150 | 117 |
| Benzoyl peroxide, g _____ | 16 | 16 |
| Water, g _____ | 1,650 | 1,913 |
| Viscosity (3, RVT at 20 r.p.m.) cps _____ | 725 | 1,350 |
| Gel time, min _____ | 2 | 1.5 |
| Mold time, min _____ | 6 | 7 |
| Dehydration time, hr _____ | 1⅓ | 1½ |
| Linear shrinkage, percent _____ | 0 | 0 |

EXAMPLE 10

A vinyl ester resin was prepared similar to Example 1 from a mixture of DER 331 and an aliphatic diepoxide having an EEW of 305 to 335 (DER 732).

First, 27.2 lbs. of DER 331, 2.7 lbs. of bisphenol A and 4 lbs. of DER 732 were reacted until the resulting polyepoxide had an EEW of about 250. Then 11.4 lbs. of methacrylic acid was added and reacted followed by blending ing 45.4 lbs. of styrene with the finished resin. To the resin solution was then added 0.1% Tergitol XH and 0.1% paraffin wax.

The water-in-resin emulsions were prepared and cured as before.

| Emulsion | 10A | 10B |
|---|---|---|
| Resin solution, g _____ | 400 | 365 |
| Terpolymer of Example 2, g _____ | 0 | 36.5 |
| Benzoyl peroxide, g _____ | 4 | 4 |
| Water, g _____ | 400 | 400 |
| N,N-dimethyl p-toluidine, ml _____ | 1.6 | 1.6 |

Both castings were dehydrated at 350° F. for 4 hours. Emulsion 10A, without the dimensional control agent, had a linear shrinkage of 4.8% while emulsion 10B had a zero shrinkage.

EXAMPLE 11

An emulsion was prepared similar to Example 10 except that the terpolymer was replaced by a styrene/ethylene (37/63) copolymer having a molecular weight of about 1660. The copolymer was employed at a loading of about 2.7 parts per 100 parts of emulsion. The shrinkage after drying at 275° F. for 2 hours was only 1.44%.

EXAMPLE 12

The effect of molecular weight on the ability of the dimensional control agent to prevent shrinkage is illustrated in this example.

The vinyl ester resin solution of Example 10 was used to prepare an emulsion employing as said control agent a polyethylene polymer with a molecular weight of 130,350.

| Emulsion | 12A | 12B |
|---|---|---|
| Resin solution, g _____ | 400 | 320 |
| Polyethylene powder, g _____ | 40 | 80 |
| Benzoyl peroxide, g _____ | 4 | 4 |
| Water, g _____ | 440 | 400 |
| Linear shrinkage, percent _____ | 4.1 | 3.13 |

Reduction in shrinkage is evident but due to the higher molecular weight the effectiveness is not as great as with lower molecular weight control agents.

Similar emulsions were prepared (@ 45% styrene and containing 0.2% paraffin wax) employing a polymer of polystyrene having a molecular weight of about 280,000.

| Emulsion | 12C | 12D | 12E |
|---|---|---|---|
| Resin solution, g _____ | 200 | 182 | 175 |
| Benzoyl peroxide, g _____ | 2 | 2 | 2 |
| Water, g _____ | 200 | 200 | 200 |
| Terpolymer of Example 2, g _____ | | 18.2 | |
| Polystyrene, g _____ | | | 25 |
| N,N-dimethyl-p-toluidine, percent in styrene, ml | 0.8 | 0.8 | 0.8 |
| Percent weight loss _____ | 51.3 | 52 | 52.1 |
| Percent linear shrinkage _____ | 3.6 | 0.67 | 3.5 |

The molecular weight of the polystyrene is too high and the polymer is ineffective in controlling shrinkage. Another series of tests were made with polystyrene polymers with varying molecular weights within the range specified herein. Emulsions were prepared, molded, cured and dehydrated similar to Example 1.

| | 15A | 15B | 15C | 15D | 15E |
|---|---|---|---|---|---|
| Resin solution, g _____ | 200 | 188 | 188 | 188 | 162 |
| PS [1]; 61,400 M.W _____ | | 12 | | | |
| PS [1]; 40,000 M.W _____ | | | 12 | | |
| PS [1]; 9,800 M.W _____ | | | | 12 | 18 |
| Benzoyl peroxide, g _____ | 2 | 2 | 2 | 2 | 2 |
| Water, g _____ | 200 | 200 | 200 | 200 | 220 |
| N,N-dimethyl-p-toluidine, g __ | 0.8 | 0.8 | 0.8 | 0.8 | 0.8 |
| Gel, min _____ | 3.2 | 2.6 | 2.5 | 3.2 | |
| Dewaters in mold _____ | Yes | No | | No. | No |
| Wt. loss (1.5 hr. at 410° F.), percent | 51.8 | 52.0 | 51.0 | 51.2 | 56.4 |
| Linear shrinkage, percent ____ | −3.65 | −1.66 | −1.33 | −0.3 | +1.16 |

[1] Polystyrene.

Another casting identical to 15E was prepared except that 0.25% zinc stearate was added to produce a tack free surface on curing. This cured casting lost 56% weight (1.5 hrs. @ 380° F.) and had a linear shrinkage of +1.2% (actually expanded slightly).

EXAMPLE 13

Four emulsions similar to Emulsions 12C and 12D were prepared and the cured emulsion dehydrated at room temperature, 75° F.

| Emulsion | Wt. percent terpolymer | Wt. percent water | Percent weight loss 60 hrs. | 90 hrs. | 33 days | Percent change in length 60 hrs. | 90 hrs. | 33 days |
|---|---|---|---|---|---|---|---|---|
| 13A | 0 | 50 | 40.3 | 45.2 | 52.0 | −2.4 | −2.4 | −3.6 |
| 13B | 2.5 | 50 | 22 | 30.7 | 51.8 | −0.4 | −0.4 | −1.6 |
| 13C | 0 | 60 | 58.7 | 62.0 | 63.0 | −3.2 | −3.6 | −4.1 |
| 13D | 2.5 | 60 | 40.8 | 47 | 62.6 | +0.4 | +0.4 | −0.8 |

EXAMPLE 14

A vinyl ester resin similar to Example 1 was prepared and emulsions prepared with a styrene/acrylic acid (3.7/1 molar ratio) copolymer as a shrink control agent. The same methods of preparing emulsions, curing and dehydrating were employed.

| | 14-A | 14-B |
|---|---|---|
| Resin solution, g | 200 | 188 |
| Styrene/acrylic acid, g | | 12 |
| Benzoyl peroxide, g | 2 | 2 |
| Water, g | 200 | 200 |
| N,N-dimethyl-p-toluidine, g | 0.8 | 0.8 |
| Weight loss, percent | 51.8 | 52 |
| Shrinkage, percent | 3.65 | 1.66 |

Various materials may be substituted and employed in place of those specifically described in the examples. For example: common general purpose unsaturated polyester resins may be employed in place of the WEP resins of Example 8; or any of the vinyl ester resins may be further reacted with an anhydride, such as maleic anhydride, before the emulsion is prepared.

Other additives may be included in said emulsions such as inert fillers and the like. Commonly used fillers include kaolin clay, silica and the like. For reasons of economics and curing rate the emulsions will usually contain from about 40 to 55 percent monomer. However, as indicated previously both lower and higher levels may be used. Emulsions have been prepared which contain 50% styrene and 20% acrylonitrile and which dewater readily demonstrating that monomer levels up to 70% are practical and operable.

It will be understood that the present invention is not limited to the specific details described above but may embody various modifications insofar as they are defined in the following claims.

What is claimed is:

1. A thermosettable water-in-oil emulsion for preparing low density thermoset foams, said emulsion provides improvement both in removing the water from the cured emulsion and in reducing dimensional change during the emulsion curing and dewatering steps, said emulsion comprising
    (a) from about 30 to 80 weight percent of a dispersed aqueous phase and about 70 to 20 weight percent of a continuous thermosettable resin phase;
    (b) from about 0.005 to 10 parts per 100 parts of emulsion of a polyethylene oxide polyalkylene oxide block copolymer nonionic surfactant wherein the polyalkylene oxide hydrophobic group has a molecular weight of at least about 1000 and wherein said polyethylene oxide hydrophilic group comprises about 44 to 90 weight percent of said surfactant; and
    (c) from about 0.1 to 20 parts per 100 parts of emulsion of a hydrocarbonaceous dimensional control agent having a molecular weight of about 200 to 150,000; wherein said agent is a polymer of an olefinic monomer or mixtures thereof and said monomer has the formula $CH_2=CH-R$ where R is hydrogen, an alkyl radical, an alkenyl radical or an aryl radical; and wherein said emulsion continuous resin phase comprises from about 30 to 80 weight percent of an unsaturated polyester, a vinyl ester resin or mixtures thereof and about 70 to 20 weight percent of a copolymerizable monomer, said vinyl ester resin is prepared by reacting about equivalent amounts of an unsaturated monocarboxylic acid with a polyepoxide resin.

2. The emulsion of claim 1 containing from about 1 to 10 parts of said dimensional control agent.

3. The emulsion of claim 1 containing from about 0.005 to 2 parts of said nonionic surfactant.

4. The emulsion of claim 1 wherein said dimensional control agent has a molecular weight of about 500 to 25,000.

5. The emulsion of claim 1 wherein said dimensional control agent has a molecular weight of about 500 to 10,000.

6. The emulsion of claim 1 wherein said monomer is an α-olefin having up to about 10 carbon atoms.

7. The emulsion of claim 6 wherein the dimensional control agent is polyethylene or an ethylene/propylene copolymer.

8. The emulsion of claim 6 wherein said olefinic monomer is partly replaced by at least one copolymerizable monomer which is not an olefinic monomer.

9. A low density thermoset resin foam prepared by curing the emulsion of claim 1 without breaking same and substantially removing the dispersed aqueous phase from said cured emulsion.

10. A low density thermoset resin foam prepared by curing the emulsion of claim 4 without breaking same and substantially removing the dispersed aqueous phase from said cured emulsion.

11. A low density thermoset resin foam prepared by curing the emulsion of claim 5 without breaking same and substantially removing the dispersed aqueous phase from said cured emulsion.

12. A low density thermoset resin foam prepared by curing the emulsion of claim 6 without breaking same and substantially removing the dispersed aqueous phase from said cured emulsion.

13. A low density thermoset resin foam prepared by curing the emulsion of claim 7 without breaking same and substantially removing the dispersed aqueous phase from said cured emulsion.

14. A low density thermoset resin foam prepared by curing the emulsion of claim 8 without breaking same and substantially removing the dispersed aqueous phase from said cured emulsion.

15. The emulsion of claim 8 wherein said nonolefinic monomer is vinyl acetate, acrylic acid, methacrylic acid, or an alkyl ester of acrylic or methacrylic acid.

16. The emulsion of claim 15 wherein the dimensional control agent is a terpolymer of 10–50 percent by weight of isobutyl acrylate, 3–15 percent by weight of propylene and the balance to make 100 percent of ethylene.

17. The emulsion of claim 15 wherein the dimensional control agent is an ethylene/isobutyl acrylate/acrylic acid terpolymer or an ethylene/vinyl acetate copolymer.

18. The emulsion of claim 1 wherein the dimensional control agent is polystyrene, a styrene/acrylic acid copolymer or an ethylene/styrene copolymer.

19. A low density thermoset resin foam prepared by curing the emulsion of claim 15 without breaking same and substantially removing the dispersed aqueous phase from said cured emulsion.

20. A low density thermoset resin foam prepared by curing the emulsion of claim 16 without breaking same and substantially removing the dispersed aqueous phase from said cured emulsion.

21. A low density thermoset resin foam prepared by curing the emulsion of claim 17 without breaking same and substantially removing the dispersed aqueous phase from said cured emulsion.

22. A low density thermoset resin foam prepared by curing the emulsion of claim 18 without breaking same and substantially removing the dispersed aqueous phase from said cured emulsion.

23. A low density thermoset resin foam prepared by curing the emulsion of claim 19 without breaking same and substantially removing the dispersed aqueous phase from said cured emulsion.

24. A process for preparing low density, porous thermoset resins which comprises
(a) forming a water-in-resin emulsion comprised of about 30 to 80 parts of an aqueous phase, about 70 to 20 parts of a resin phase, about 0.005 to 10 parts per 100 parts of said emulsion of a polyethylene oxide polyalkylene oxide block copolymer nonionic surfactant having a polyalkylene oxide hydrophobic group with a molecular weight of at least about 1000 and a polyethylene oxide hydrophilic group which comprises about 44 to 90 weight percent of said surfactant and about 0.1 to 20 parts per 100 parts of said emulsion of a hydrocarbonaceous dimensional control agent having a molecular weight of about 200 to 150,000;
(b) curing said emulsion to thermoset said resin; and
(c) substantially dehydrating said thermoset resin;

wherein said resin phase comprises about 30 to 80 weight percent of an unsaturated polyester, a vinyl ester resin or mixtures thereof and about 70 to 20 weight percent of a copolymerizable monomer;
wherein said vinyl ester resin is prepared by reacting about equivalent amounts of an unsaturated monocarboxylic acid with a polyepoxide resin; and
wherein said dimensional control agent is a polymer of an olefinic monomer or mixtures thereof and said monomer has the formula $CH_2=CH-R$ where R is hydrogen, an alkyl radical, an alkenyl radical or an aryl radical.

References Cited
UNITED STATES PATENTS 3,669,911   6/1972   Nojvos _____ 260—2.5 L JOHN C. BLEUTGE, Primary Examiner W. J. BRIGGS, Sr., Assistant Examiner U.S. Cl. X.R.

260—2.5 EP, 2.5 L, 29.2 UA, 29.2 EP, 29.6 NR, 29.6 XA, 29.6 RB, 29.6 WQ, 823, 837 R, 835, 836, 862, 874, 897, 901